G. W. TUCKER.

Assignor to THE AMERICAN RING CO.

Umbrella-Handle.

No. 8,425. Reissued Sept. 24, 1878.

Attest:
R. A. Foster
Courtney A. Cooper

Inventor:
G. W. Tucker
By his attorney
Charles E. Foster

N. PETERS, PHOTO-LITHOGRAPHER, WASHINGTON, D. C.

UNITED STATES PATENT OFFICE.

GEORGE W. TUCKER, OF WATERBURY, CONNECTICUT, ASSIGNOR TO THE AMERICAN RING COMPANY, OF SAME PLACE.

IMPROVEMENT IN UMBRELLA-HANDLES.

Specification forming part of Letters Patent No. 160,627, dated March 9, 1875; Reissue No. 8,425, dated September 24, 1878; application filed July 27, 1878.

DIVISION A.

*To all whom it may concern:*

Be it known that I, GEORGE W. TUCKER, of Waterbury, New Haven county, Connecticut, have invented an Improvement in Handles for Umbrellas, &c., of which the following is a specification:

The object of my invention is a handle for umbrellas, parasols, &c., which, while light in weight, shall be strong and durable, presenting a surface capable of being highly finished and ornamented without the use of any expensive materials.

Figure 1:
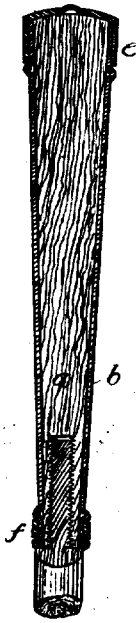
Figure 2:
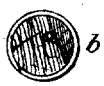

In the drawing which forms part of this specification, Figure 1 is a longitudinal section of the handle, and Fig. 2 a cross-section.

The stock or body *a* of the handle is of wood, of any desired size and shape, and upon this wooden stock is applied a sheet-metal tube or covering, *b*, which fits closely to the stock, and in connection therewith constitutes the handle. This combination of wood and metal is most effective, resulting in a handle much stronger than one made wholly of wood and much lighter than one entirely of metal.

The metal covering *b* strengthens the wooden core, especially at the smaller end, where it is socketed to receive the tenon of the stick, while the wood imparts rigidity to the metal, so that a covering of thin light plate may be employed. The metal covering further affords facility for ornamentation when tin is used by developing the granulated or crystalline character of the metal by an etching and coloring process previous to varnishing the same. This prepared tin is sometimes called "*moire metallique*," and the varnish applied to the same is to be such as to imitate the color of pearl.

In order to make the handle cheaply the metal covering must be made from a flat sheet of metal, which is rolled up, overlapped at the edges, and can be soldered at the ends of the joint; and the tip-cap *e*, applied at the butt, and band *f*, at the smaller end, impart additional strength and security.

I claim—

1. A handle for umbrellas or parasols consisting of a core or body of wood, and a case of sheet metal inclosing the core and strengthened by the same, substantially as set forth.

2. A handle for umbrellas or parasols consisting of a core or body of wood, and a case or covering of sheet metal inclosing said core and bent to lap at the edges, and a band and a cap-piece binding the casing, substantially as set forth.

In testimony whereof I have signed my name to this specification in the presence of two subscribing witnesses.

G. W. TUCKER.

Witnesses:

BARTOLO D'AUBIGNÉ,

H. M. STOCKING.